W. F. WALLACE.
COLLAR FASTENER.
APPLICATION FILED OCT. 7, 1913.
1,147,057.
Patented July 20, 1915.
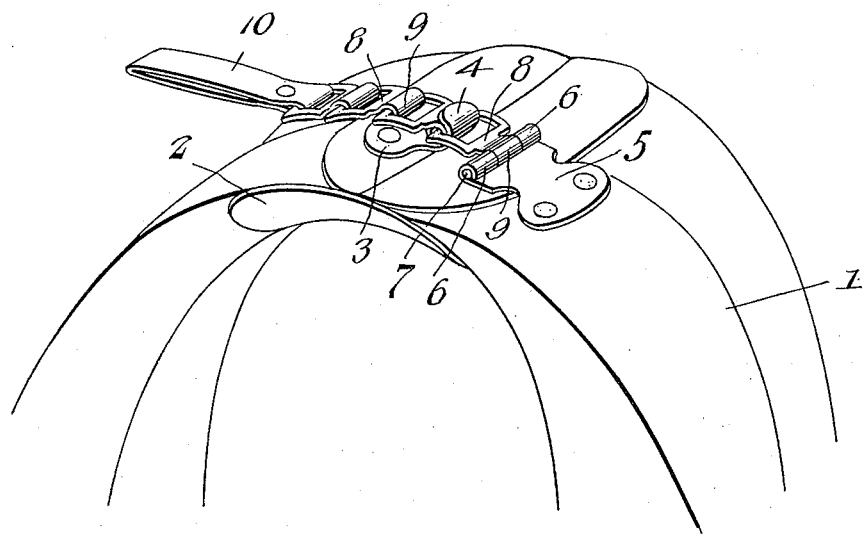
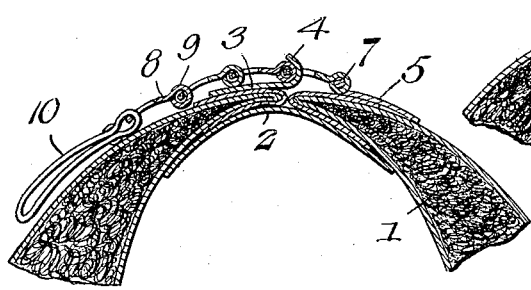
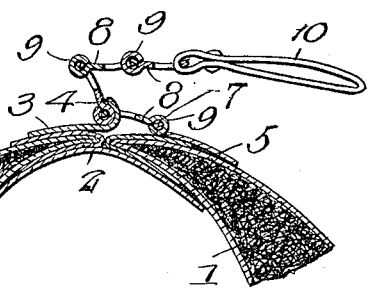
Witnesses
Hugh H. Ott
K. Peacock
Inventor
William F. Wallace
By Victor J. Evans
Attorney

UNITED STATES PATENT OFFICE.

WILLIAM F. WALLACE, OF NEW BRAUNFELS, TEXAS.

COLLAR-FASTENER.

1,147,057.  Specification of Letters Patent.  Patented July 20, 1915.

Application filed October 7, 1913. Serial No. 793,894.

*To all whom it may concern:*

Be it known that I, WILLIAM F. WALLACE, a citizen of the United States, residing at New Braunfels, in the county of Comal and State of Texas, have invented new and useful Improvements in Collar-Fasteners, of which the following is a specification.

This invention has relation to collar fasteners and it consists in the novel features hereinafter described and claimed.

An object of the invention is to provide a fastener of simple and durable structure which is adapted to be used upon a horse collar for effectually holding the end portions of the same in proper relation.

Another object of the invention is to provide a fastener of the character indicated with engageable members of such configuration that they may be easily and quickly manipulated to disconnect one from the other.

With these and other objects in view the fastener comprises two members adapted to be secured to the end portions of the collar, one of the said members having an upwardly disposed hoof. The other member is provided with a shaft to which is pivotally connected the terminal link of a chain. The links of the said chain are of peculiar configuration. They are curved slightly longitudinally and each link is provided with an opening adapted to receive the hook. Each link is provided at its side with an eye which is adapted to receive the side portion of an adjacent link and the links are so assembled that the side portion of the link may be used as a fulcrum to bear against the end of the hook to pry the links out of engagement with the hook when it is desired to disconnect the ends of the collar.

In the accompanying drawing:—Figure 1 is a perspective view of the fastener applied. The other views are details of the various features of the fastener.

As shown in the drawing the collar is indicated at 1 and it is provided with the usual cap piece 2 which is adapted to bridge the space between the ends of the collar when the collar is in position upon the neck of an animal. A member 3 is riveted or otherwise secured to one end portion of the collar 1 and is provided with an outwardly disposed curved hook 4. A member 5 is riveted or otherwise secured to the other end portion of the collar 1 and is provided with lugs 6 in which the end portions of a shaft 7 are secured.

The terminal link of a chain is pivotally connected with the shaft 7 and is held against movement longitudinally of the shaft by the lugs 6. As these links are all of the same pattern or design a description of one will answer. Each link 8 is curved longitudinally and is approximately rectangular in plan. Each link is provided at one side with an eye 9 which pivotally receives the side portion of the adjacent link. A hand piece 10 is carried at the terminal link of the free end of the chain.

When the collar is in position upon the neck of an animal its ends are drawn together and then the chain is swung over the member 3 so that hook 4 is passed through the opening of one of the links 3. When this takes place the side of the eye of the adjacent link bears against the inner surface of the hook 4. Thus the ends of the collar are secured together. When it is desired to separate the ends of the collar an operator grasps the hand piece 10 and swings the same back over the member 5 and in doing so the links which previously were positioned over the member 3 are swung back over the member 5. As the eye which is in contact with the hook 7 turns the side of the link to which the said eye is attached engages the end of the hook. Then by pressing the said link down toward the member 5 the side of the link serves as a fulcrum and its eye is lifted up out of the hook 4 as soon as the eye clears the upper end of the hook 4 the adjacent has been moved above the upper end of the hook and consequently the entire chain may be swung back away from the hook and the ends of the collar may be readily spread or separated.

The advantage of the present arrangement is that notwithstanding an adjustable means is provided for connecting the end portions of a collar together each link in the said chain may be used in conjunction with the hook as a fulcrum for lifting the eye of any particular link out of engagement with the hook. This greatly facilitates the unclasping of the device and the separation of the ends of the collar when it is desired to remove the same from the neck of the animal.

Having thus described the invention what is claimed as new is:—

A collar fastener comprising a member secured to one end portion of the collar and having a hook, a member secured to the other end portion of the collar, and a chain the terminal link of which is pivotally connected with the last mentioned member, all of the links of the chain being curved longitudinally and being approximately rectangular in plan, each link having at that end which is disposed toward the said terminal pivoted link an eye and an adjacent solid portion disposed between the eye and the intermediate portion of the link, the parts being so arranged that when the hook is passed through the opening in one link it engages the eye of the adjacent link and when the link having the engaged eye is swung toward the hook the solid portion of the said link encounters the hook and serves as a fulcrum for lifting the eye out of engagement with the hook.

In testimony whereof I affix my signature in presence of two witnesses.

WILLIAM F. WALLACE.

Witnesses:
ALTHEA O. TAUSCH,
LLEWELLYN H. BLEVENS.

Copies of this patent may be obtained for five cents each, by addressing the "Commissioner of Patents, Washington, D. C."